T. FARR.
LAWN MOWER.
APPLICATION FILED NOV. 5, 1907.

911,962.

Patented Feb. 9, 1909.

WITNESSES:

INVENTOR,
THOMAS FARR,
by
Attorneys.

UNITED STATES PATENT OFFICE.

THOMAS FARR, OF SUTTON-COLDFIELD, ENGLAND.

LAWN-MOWER.

No. 911,962.          Specification of Letters Patent.          Patented Feb. 9, 1909.

Application filed November 5, 1907.   Serial No. 400,798.

*To all whom it may concern:*

Be it known that I, THOMAS FARR, a subject of the King of Great Britain, residing at "Granville," Maney Hill Road, Sutton-Coldfield, in the county of Warwick, England, gentleman, have invented certain new and useful Improvements in Lawn-Mowers, of which the following is a specification.

This invention provides an improved grass-box for lawn-mowing machines, having means mounted and working in it for clearing the grass from the knives, thus keeping the blades cleaner and consequently sharper, and considerably improving the working of the machine, while saving the time hitherto wasted in frequently emptying the box, as a larger box can be used.

The means for clearing the grass from the lower edge of the box, which is usually adjacent to the machine knives, and conveying the same to the far end and back of the box, comprise a rake, or a series of rakes, scrapers, or the like, mounted to rotate in the box, or to travel with an endless band, chain, or the like therein.

These rakes, scrapers, or the like, may be driven by a roller under the box bearing on the ground or by any other means.

Figure 2:
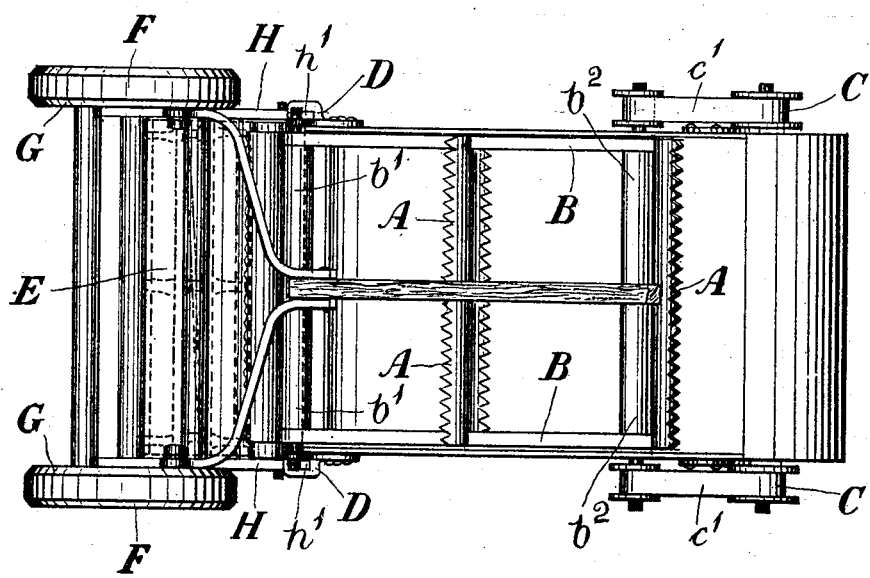
Figure 1:
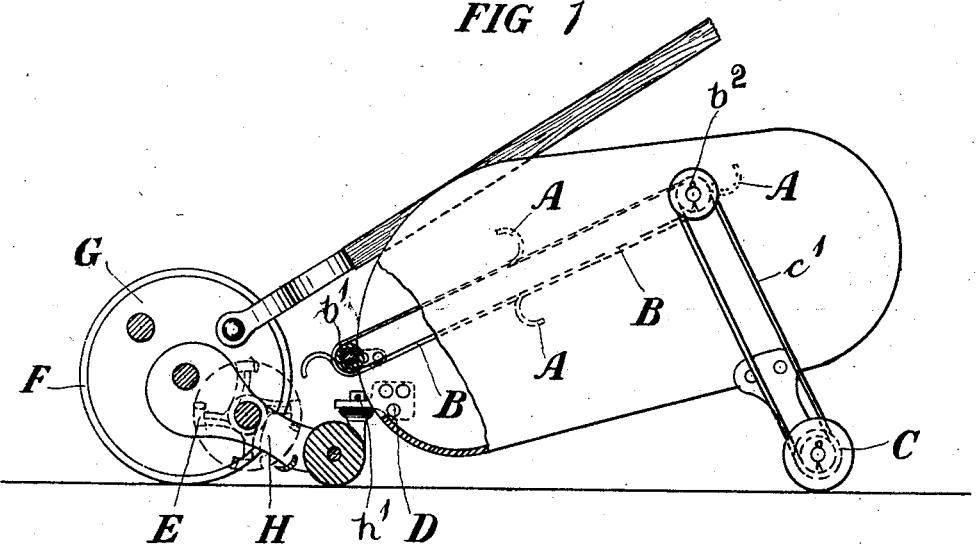

On the drawings appended to this specification: Figure 1 is a sectional view, partly through the grass-collecting box, of a lawn mower according to this invention, and Fig. 2 is a fragmentary plan view thereof.

In this example the rakes A are mounted on endless bands, chains or the like B, inside the box. The rakes may be mounted on the bands by small pins and nuts passing through extended flanges formed at the ends of the rakes, or by any other means. The bands B as shown, are passed over a roller $b^1$ at the lower end of the box and over a roller $b^2$ at the upper end of the box. The roller or shaft $b^2$ is driven by bands $c^1$ from pulleys, mounted on the spindle of a roller C bearing on the ground. This roller C would preferably be roughened or milled to improve its grip.

The front end of the box is provided with eye pieces D serving for taking over projections or plates on the mower to secure the box in position; any locking means such as pegs through perforations in a plate, simple cotters or other means may be provided in conjunction with this.

The box illustrated is mounted at the back of the lawn mower in the same position as an ordinary box made to follow the machine; the approximate position of the knives is indicated by the dotted circle E. The box which is provided with lugs D with holes is made to fit over slotted projections $h^1$ which are carried on the arms H attached to the disk pieces G on the inside of the wheels F. The box is secured by means of pins or other suitable fasteners passing through the slot in the projection $h^1$ as shown on the drawings. As the box is thus moved along with the mower its driving roller C is rotated imparting motion, through the band $c^1$ to the roller or shaft $b^2$ and thus driving the endless bands B and consequently the rakes A. The rakes following the movement of the band pass close to the machine knives clearing the cut grass from same and conveying it in a sure and effective manner toward the back of the box. By the employment of such a device it is obvious that a much larger box can be used than was possible with machines where no means for carrying away the grass were provided. In this way a double advantage is obtained as the knives are kept clean and more effective in their working and the time of the operator is saved, as it is not necessary for him to empty the box frequently and use his hands for clearing the grass to the back of the box as has hitherto been the case.

It must be understood that the invention admits of more ways of carrying out than the simple form here shown, but that is quite sufficient to enable the same being properly understood and its applications appreciated.

Any suitable gearing may be used for driving the rakes and it may be connected up to any convenient moving part of the mower if desired, instead of to a separate driving roller.

What I claim then is:

1. A lawn mower provided with cutting knives, in combination with a grass box provided with rollers and having mechanical means for raking the cut grass from the front to the back of the box, in a direction corresponding to the disposition of the box bottom, said means comprising rakes mounted to travel round the rollers from the rear of the knives toward the end of the box remote from the knives.

2. The combination, with a grass box for a lawn mower, of rollers located at the front and back of the box and carrying endless bands, cutting knives, rakes placed on said bands for moving the cut grass from the underside of the front roller near to the knives up to the end of the box which is remote from the cutters, and mechanical means for actuating said rollers.

3. In a lawn mower, a grass box having in combination a driving roller for bearing on the ground, means for connection of the box to the mower, a shaft across the top of the box, driving means from said roller to said shaft, said shaft being provided with a roller, a roller at the end of the box nearest said connecting means, knives adjacent to said last-named roller, endless bands passing over said rollers and grass collecting means secured to said endless bands and caused thereby to travel close to the revolving knives of the mower and then on the underside of the rollers to the back of the box.

In testimony whereof, the said THOMAS FARR has signed his name to this specification in the presence of two subscribing witnesses, this 26th day of October 1907.

THOMAS FARR.

Witnesses:
F. GILBERT BRETTELL,
STANLEY BANNER.